US006271837B1

(12) United States Patent
Naiff (10) Patent No.: US 6,271,837 B1
(45) Date of Patent: Aug. 7, 2001

(54) PERSONAL COMPUTER-BASED SET-TOP CONVERTER FOR TELEVISION SERVICES

(75) Inventor: Kenneth L. Naiff, Newark, DE (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/346,175

(22) Filed: Jul. 1, 1999

Related U.S. Application Data (62) Division of application No. 08/957,196, filed on Oct. 24, 1997.

(51) Int. Cl.[7] .................................................. G06F 13/00
(52) U.S. Cl. .......................... 345/327; 345/327; 348/552
(58) Field of Search ............................ 345/327, 326; 348/6, 10, 8, 13, 11, 12, 14, 552, 15, 16, 906, 724, 460, 461, 468, 7, 570; H04N 7/16, 7/00

(56) References Cited

U.S. PATENT DOCUMENTS

| | | |
|---|---|---|
| 4,761,684 | 8/1988 | Clark et al. |
| 5,089,885 | 2/1992 | Clark ...................................... 358/86 |
| 5,101,499 | 3/1992 | Streck et al. .............................. 455/4 |
| 5,192,299 | 3/1993 | Graczyk et al. ......................... 358/85 |
| 5,251,301 * | 10/1993 | Cook .................................... 348/552 |
| 5,523,781 * | 6/1996 | Brusaw .................................. 348/12 |
| 5,589,892 | 12/1996 | Knee et al. ........................... 341/731 |
| 5,635,979 | 6/1997 | Kostreski et al. ..................... 348/13 |
| 5,650,831 | 7/1997 | Farwell ................................. 348/734 |
| 5,790,201 | 8/1998 | Antos .................................... 345/327 |
| 5,833,468 * | 11/1998 | Guy ........................................ 348/13 |
| 5,852,437 * | 11/1999 | Wugofski ............................. 345/327 |
| 5,995,155 * | 11/1999 | Schindler ............................. 348/461 |
| 6,052,145 * | 4/2000 | Macrae .................................. 348/10 |

FOREIGN PATENT DOCUMENTS

| | | |
|---|---|---|
| WO 95/01058 | 1/1995 | (WO) . |
| WO 96/26493 | 8/1996 | (WO) . |
| WO 97/13368 | 4/1997 | (WO) . |
| WO 98/03012 | 1/1998 | (WO) . |

OTHER PUBLICATIONS http://hades.monaco.mc/tv news/96may.html (May 1996), p. 3, concerning BT Interactive TV Service and Apple PCs.

* cited by examiner

Primary Examiner—Matthew Luu
Assistant Examiner—Wesner Sajous
(74) Attorney, Agent, or Firm—Barry R. Lipsitz; Douglas M. McAllister (57) ABSTRACT

A peripheral device is provided for a personal computer enabling the PC to provide the functions of a set-top box for television reception. Communication of television and control signals between the television and PC can be provided over the cable wiring already provided in the subscriber premises. Alternatively, wireless communication can be provided between the television and the PC. The invention obviates the need for a set-top box and the associated expense thereof. The television operations take place in the multitasking environment of the PC, so that the PC can be concurrently used for other applications.

13 Claims, 6 Drawing Sheets

PERSONAL COMPUTER-BASED SET-TOP CONVERTER FOR TELEVISION SERVICES

This application is a divisional of co-pending, commonly assigned U.S. patent application Ser. No. 08/957,196 filed on Oct. 24, 1997.

BACKGROUND OF THE INVENTION

The present invention relates to subscription television services which may be provided by cable or satellite, and more particularly to a television interface which may be provided as a personal computer (PC) peripheral that enables a PC to receive, select and process television signals for use by a conventional television appliance such as a television set, VCR, or the like.

To date, the provision of cable television and satellite television services has focused on the use of a stand-alone "set-top" converter which converts signals from the cable or satellite television system into signals that can be displayed on a standard television. Various approaches combining both the television and the set-top box have been considered in order to obviate the necessity for a stand-alone set-top box. Such approaches require the set-top box hardware to be incorporated into a television set, increasing the cost and complexity of the television. The use of a stand-alone set-top box also represents a significant cost, with current set-tops generally costing the system operator on the order of $250.00 to $350.00 each. This cost is generally an upfront expense which will only be paid back after a subscriber has subscribed to and paid for television services over a period of time.

Cable and satellite television system operators are in the process of implementing digital television distribution systems. Digital technology provides higher quality television reception as well as the availability of additional services such as electronic program guides and interactivity. However, the implementation of digital systems is costly and has various market drawbacks. These include the rapid change of digital technology and demands for more, faster and better services which challenge existing hardware. Providing new hardware to keep up with new services is costly, and may therefore be economically unattractive to the television system operators.

Moreover, digital set-top boxes are not typically backward compatible with present analog set-tops. In fact, there is a growing divergence between the two that will keep digital services at a compatability disadvantage as long as analog systems are in place.

Still further, multiple in-home digital set-tops are not economically viable. Thus, cable television system operators are not willing to provide digital services to more than one television set in a consumer's home for the standard monthly service fees.

Current digital set-top boxes have several hardware drawbacks as well. For example, the over-utilization of the microprocessor in presently available set-tops slows down the consumer interactivity for functions such as channel change and electronic program guide retrieval. Memory in digital set-tops is also limited due to its cost. This limits the electronic programs guide features as well as firmware/software updates. Present day digital set-tops also have a limited capability to handle multiple resident programs and applications. Moreover, graphics capability is limited by cost considerations in designing an economical digital set-top box.

It would be advantageous to provide a system for overcoming the drawbacks of current set-top boxes. Such a system should enable multiple services (e.g., television services and/or data services such as Internet access) to be accessed concurrently. The system should also be compatible with cable television, satellite television, and multichannel multipoint distribution services (MMDS).

It would be further advantageous to provide a system in which no stand-alone set-top box is required. This system should be less expensive than present day systems for providing subscription television services and should be versatile enough to enable new applications to be implemented without the need for new hardware. Moreover, it would be advantageous for such a system to utilize existing hardware, such as random access memory (RAM) data storage provided by a hard drive or the like, and communications capability, already provided in a user's PC. The expanded hardware capabilities of a PC, for example, would enable new and greatly enhanced features and services that are not currently available via a set top box.

The present invention provides a television system having the aforementioned and other advantages, wherein a personal computer is used to provide a television interface between a subscription television system and one or more subscriber television appliances.

SUMMARY OF THE INVENTION

In accordance with the present invention, a peripheral device is provided for a personal computer. The peripheral includes a television interface for enabling the PC to receive, select and process television signals, which may be digital or analog. A communications port operatively associated with the television interface communicates the television signals processed by the interface to a television appliance such as a television set, VCR, or the like.

The television interface can comprise audio and/or video decompression means for decoding (e.g., digitally) the television signals. PC application software operatively associated with the peripheral device is adapted to run on the PC for controlling television functions provided by the television interface. For example, the software can provide an electronic program guide function to the television appliance via the television interface. The software is advantageously adapted to run in a multitasking mode with other unrelated applications in the PC. For example, the PC can run a Windows operating environment wherein the software associated with the peripheral device is multitasked with other applications. in this manner, television services provided on the television appliance and unrelated applications provided on the PC can be concurrently accessed. Thus, for example, one person may be watching a television program on a television set receiving signals from the television interface of the PC, while another person is concurrently running PC applications directly on the PC. The PC is thus shared by both users, whereby the person viewing television programs can interact with the television and television service provider without affecting the work being done by the second person on the PC. The PC monitor can also be used to independently display television programs in addition to having programs displayed (or recorded) on the separate television appliance.

The television interface can include means for converting video and audio data into a composite analog waveform complying with a conventional analog television standard, such as the National Television Systems Committee (NTSC) standard. The television interface can also convert graphics data for insertion into the composite analog waveform. Such graphics data can be used, for example, in providing an electronic program guide and/or for targeting text messages to subscribers.

The television interface can further include means for modulating the television signals on a carrier for output to the television appliance on a standard television channel frequency. In one embodiment, the television interface includes a communications port (e.g., coaxial cable connector) for coupling the modulated carrier to the television appliance.

In another embodiment, the communications port provides wireless communication with the television appliance. The wireless communication may be provided over a wireless link which comprises first and second transceivers. The first transceiver is operatively associated with the PC television interface for transmitting the television signals to the television appliance and receiving control signals from the television appliance, e.g., indirectly or directly from a remote control associated with and, for purposes of this disclosure, considered to be part of the television appliance. The second transceiver (which can comprise the transmitter built into the user's remote control and a separate receiver coupled to a television set, VCR or the like) is operatively associated with the television appliance for receiving the television signals from the PC television interface. In an embodiment where the television remote control does not communicate directly with the first transceiver, the second transceiver transmits the control signals indirectly from the remote control of the television appliance to the first transceiver. In this case, the second transceiver can be part of a user interface module located at the television appliance and operatively associated therewith. The second transceiver can include means for modulating the received television signals on a carrier for output to the television appliance on a standard television channel frequency.

The television interface can also include means for generating video and/or audio output signals from the television signals which enable television services to be viewed on a display (e.g., a computer monitor) associated with the PC. The television interface can further include means for providing Internet access to the television appliance via the PC.

The communications port of the peripheral device is preferably bidirectional. The provision of a bidirectional port enables the PC to respond to commands received from the television appliance (or directly from a remote control associated therewith) via the communications port. Such commands can be used, for example, to select and process the television signals. The television interface can further include means for generating an on screen display for output to the television appliance.

A user interface for a cable television system is provided in accordance with the present invention. The user interface comprises means for inputting user requests. Means responsive to the inputting means convert the user requests into electrical signals. First means are provided for communicating the electrical signals to a personal computer. Second means are provided for receiving television signals from the PC in response to the electrical signals. Third means communicate the received television signals to a television appliance.

The PC used in connection with the user interface receives television signals from, for example, a cable television distribution system. In such an implementation, the first means of the user interface are coupled to the cable distribution system for communicating the electrical signals to the PC. The television signals are communicated from the PC to the user interface via the cable distribution system. The television signals may be transmitted from the PC on a fixed television channel frequency. In such an embodiment, a notch filter is provided for blocking the television signals on the fixed television channel frequency from interfering with other signals on the cable distribution system. The first and second means can alternatively comprise one or more wireless communication paths.

A television system is provided for use with a personal computer and a television appliance which is independent of the PC. The system comprises a television interface operatively associated with the PC. The television interface includes a tuner enabling the selection of television services for output to the television appliance. A user interface is adapted to be colocated with the television appliance and in communication with the PC. This enables a user to remotely control the PC to select television services to be displayed on the television appliance.

The user interface and PC can communicate over a wireless link comprising first and second transceivers. The first transceiver is operatively associated with the television interface at the PC for transmitting the television services to the television appliance and receiving control signals from the user interface. The second transceiver is operatively associated with the television appliance and the user interface for receiving the television services from the television interface and transmitting the control signals from the user interface. The transmitter and receiver components of the second transceiver can be separate. For example, the receiver portion can be coupled to provide the television signals to the television appliance, while the transmitter is located in the user's hand held remote control for direct communication with the first transceiver located at the PC. The television interface can include means for controlling a video recorder in response to instructions received from the user interface.

An advantage of the invention is that the PC provides computer resources for use by said television interface. In particular, these computer resources are shared by the PC and the television interface, and may include at least one of a hard drive, random access memory and a central processing unit. The shared computer resources of the PC may be used by the television interface to provide, for example, digital television services (e.g., HDTV or NTSC quality digital signals) to said user. The television interface can also be used to provide compatibility among a plurality of consumer television appliances coupled thereto, such as VCR's, television sets, video cameras, and the like.

DETAILED DESCRIPTION OF THE INVENTION

The present invention uses a personal computer to provide an interface between a subscription television service provider and a user's television appliance. In a preferred embodiment, composite video and audio is converted from a digital signal source into a standard (e.g., NTSC, PAT, SECAM, etc.) television format for output from the PC to the consumer's television, negating the need for a set-top box.

Figure 1:
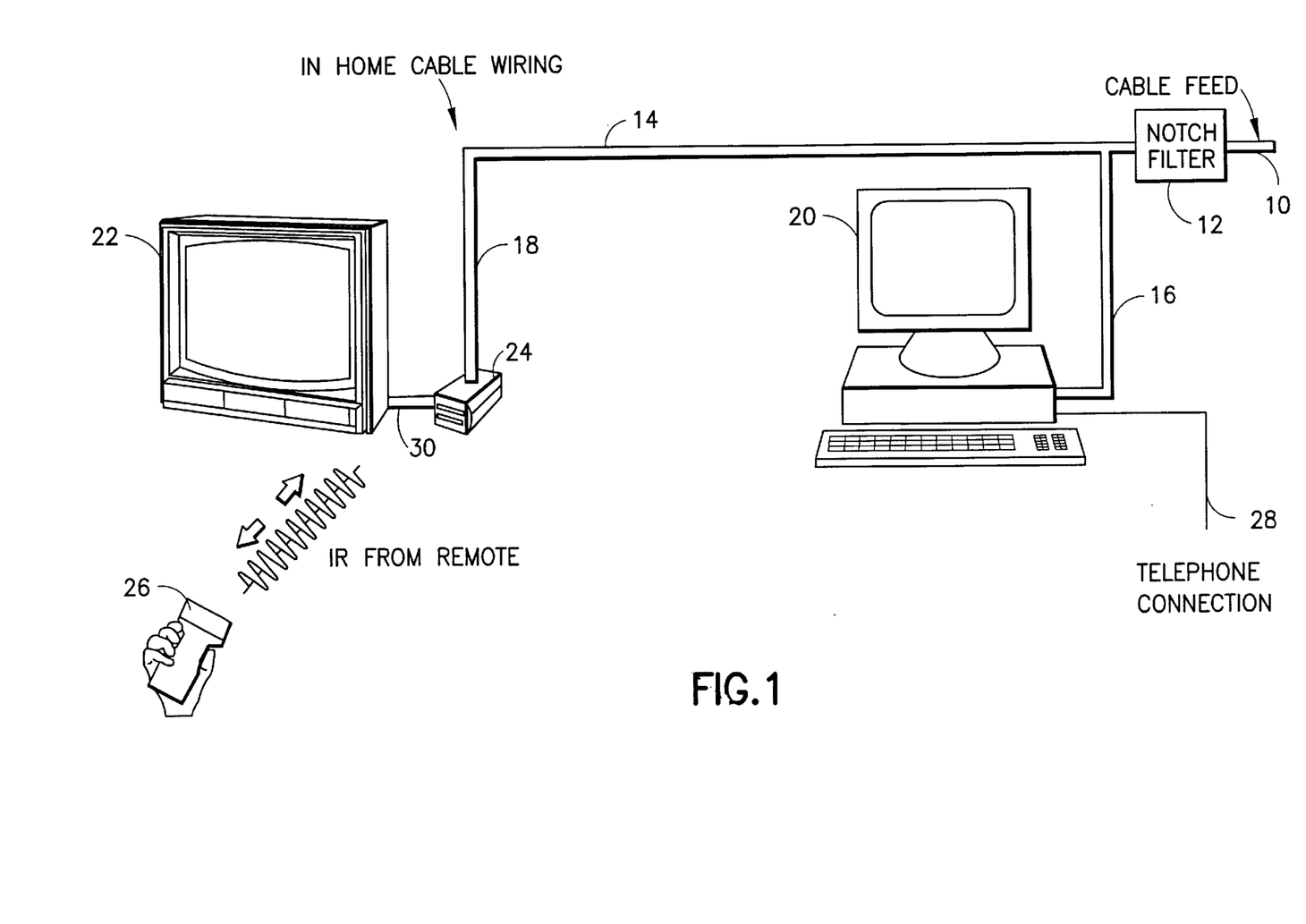
FIG. 1 is a block diagram of a first embodiment of a subscription television system in accordance with the present invention.

FIG. 1 provides a general overview of the present invention in block diagram form. Television signals are provided via a cable television feed 10. It is noted that although a cable television implementation is illustrated, the signals communicated via input cable 10 could just as easily come via a satellite or MMDS television distribution system. The signals could also be received via fiber optic cable or copper wires from an alternative television signal supplier such as a local telephone company. A cable television company may also provide signals directly over a fiber optic cable.

A notch filter 12 is placed in series with the incoming television signals to prevent signals from a personal computer 20 via lines 16 and 14 and/or from a user interface module 24 via lines 18 and 14 from being transmitted to the cable system outside of a user ("subscriber") premises. Line 16, as well as line 14 and 18 comprise the standard coaxial cable already present in a user's home for distributing television signals. It will be appreciated that in the future, fiber optic cable may be used instead of coaxial cable in the subscriber premises.

In accordance with the present invention, television signals arriving via cable 10 and line 16 are input to PC 20 for processing. Typically, these will be digital television signals although it is possible that PC 20 can be used to process input analog signals as well. The present invention provides a peripheral card for PC 20 that is connected to the motherboard of the PC via a conventional expansion slot, which provides, e.g., a PCI interface. Instead of an internal card, the peripheral could comprise an external stand-alone box that interfaces with the PC 20 via a serial or parallel port. However, the provision of an external box adds cost in terms of the necessary housing and other components, and somewhat defeats the purpose of providing a cost effective solution which obviates the need for a set-top box.

The television signals received by PC 20 are processed by the television interface peripheral card using resources already present in the PC. These resources include the computer processor (CPU), memory, power supply, hard drive and associated components of the PC. In this manner, the functions of a set-top as well as additional functions can be provided without duplicating hardware that is already contained in a PC. The peripheral card need only include the specialized components necessary to process the incoming television and control signals. Such components may include, for example, a tuner with associated television signal processing circuitry; access control circuitry; limited memory for functions such as data processing, booting of the peripheral card, on screen display and video processing; audio/video decompression circuitry; video and audio multiplexers; and an upconverter for outputting a signal on a frequency that can be received by a user's television. The peripheral card may also contain its own CPU to control on board functions that are not assigned to the main CPU in the PC. In an implementation which receives digital television signals, the digital signals are decoded and converted to a standard television format such as NTSC, PAL or SECAM and output via lines 16, 14 and 18 to a user interface module 24.

In one embodiment, the user interface module contains a transceiver that is responsive to control signals (e.g., infrared signals) from a user's remote control 26. For example, a user may select a particular channel for viewing by entering the channel number on the remote control. The remote control sends an appropriate IR signal to user interface module 24 which decodes the IR signal and forwards a corresponding electrical signal back to PC 20 via lines 18, 14 and 16. The television interface peripheral card or external peripheral device (referred to hereinafter as the "television interface") associated with PC 20 decodes the electrical signal forwarded by user interface module 24. In response to the decoded user request, the television interface circuitry associated with PC 20 will tune to the requested channel, process it as necessary and provide the processed signal in the proper format for output to a user's television via lines 16, 14, 18, user interface module 24 and line 30. The user's television 22 processes this signal in a conventional manner to provide a television service to the user. The operation of the user interface 24, 26 is described in greater detail below in connection with FIGS. 5 and 6.

The television interface provided for use with PC 20 can also convert text and graphic data received, for example, via the Internet into a video format for inclusion in the composite analog waveform output to user interface module 24 via lines 16, 14 and 18. The upconversion of the composite analog waveform to a standard television signal frequency will enable the television 22 to display the text and/or graphics data.

A telephone connection 28 is provided in a conventional manner so that the PC 20 can communicate with the Internet via a standard modem. Alternatively, communication with the Internet and/or the television service provider can be accommodated by an RF return path via coaxial or optical fiber cables 16, 10. Such RF return paths are well known in the art. Application software running in the PC 20 directs the Internet data to the television interface so that the latter can incorporate this data into the composite signal forwarded to the user's television for display.

Figure 2:
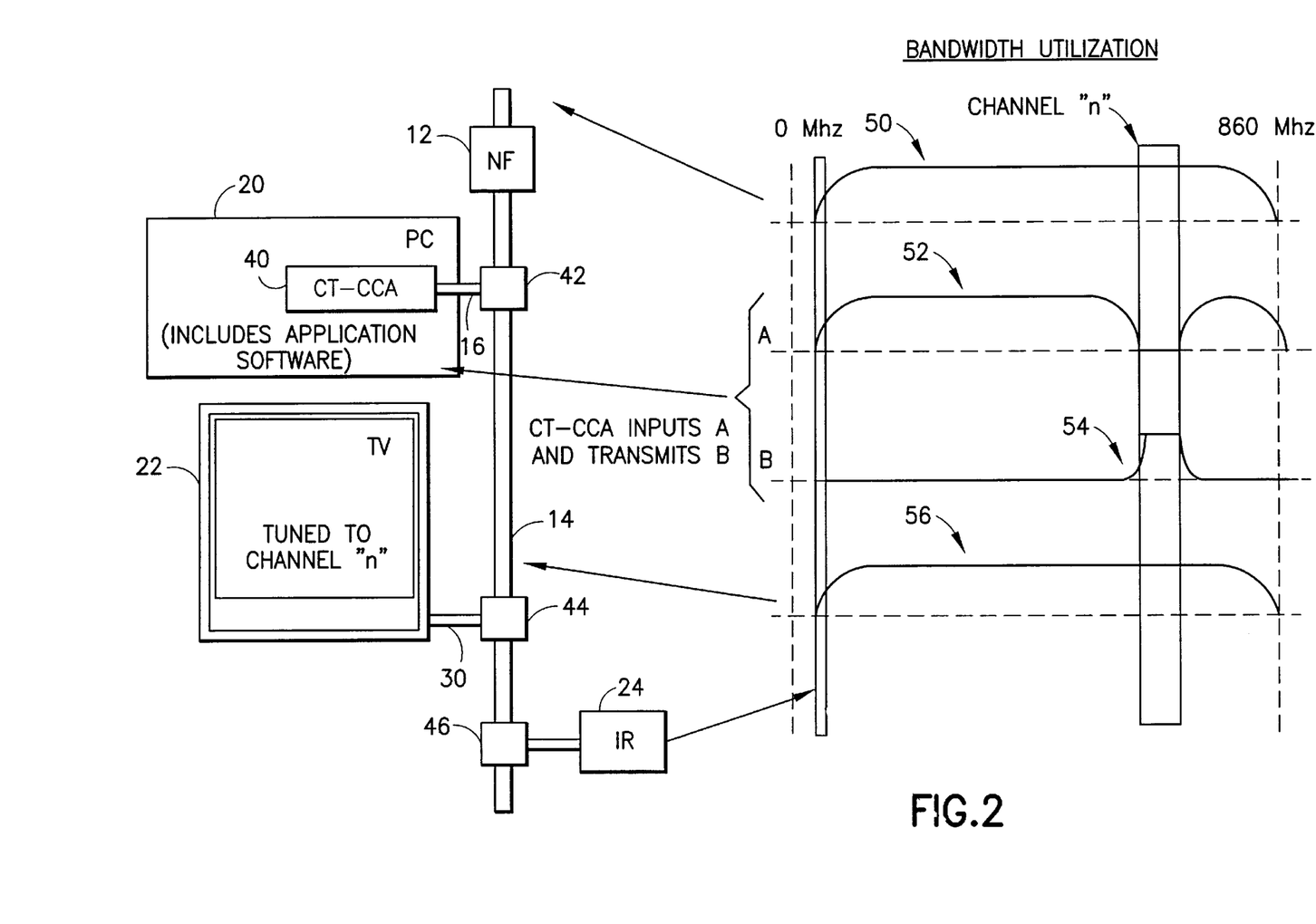
FIG. 2 is a block diagram illustrating a cable television implementation of the present invention.

FIG. 2 illustrates the main components of FIG. 1 in greater detail, and shows the utilization of bandwidth within a cable television spectrum for each of the components. In the example illustrated in FIG. 2, the bandwidth of the cable television spectrum extends from 0 to 860 MHz. It should be appreciated that the bandwidth utilization illustrated in FIG. 2 is for illustrative purposes only, and that other bandwidths may be used now or in the future.

As shown in FIG. 2, PC 20 includes a television interface peripheral card 40 referred to as a "cable television circuit card assembly" (CT-CCA). The circuit card 40 is illustrated in greater detail in FIG. 3. This card is accepted into a conventional expansion slot of the PC. The PC includes application software which is downloaded over the cable distribution system or alternatively, installed via floppy disk, CD-ROM, or other well known media. The software could also be downloaded to the PC via a telephone communication path, satellite television path, MMDS, or any other available communication path. It will be appreciated that the downloaded data can be provided as either in-band or out-of-band data, as well known in the art. The application software controls the various functions of the television interface card 40, including the generation of electronic program displays from data provided by the television system operator. The application software resident in the PC will also be used to tune to channels requested by a user via the hand held remote control 26 and user interface module 24, to control the bidirectional communication between the user interface module 24 and the PC 20, and may be used to implement security features such as preventing piracy of television signals.

A key advantage of the present invention is that little or no modification needs to be done to the existing wiring in a subscriber's home. Cable 14 is the existing cable within the consumer's home. In order to implement the system of the present invention, a tap 42 is placed on the in-home coaxial cable (if such a tap is not already present) to enable the PC television interface card 40 to be coupled to the cable via line (e.g., coaxial cable) 16. A tap 46 is provided for the user interface module 24. Although a separate tap 46 is illustrated in FIG. 2, it should be appreciated that the user interface module 24 could tap directly into tap 44 which is already present for the user's television. In this instance, a splitter is provided within user interface module 24 that provides a tap to which the user's television 22 is connected. Thus, as illustrated in FIG. 1, the user interface module would connect to cable 14 via line 18 (and tap 44 not shown in FIG. 1). The user's television would be coupled to the cable 14 via line 30 and a splitter internal to user interface module 24, which couples line 30 to line 18.

A notch filter 12 is also provided to prevent signals output by the PC 20 on line 16 and output by user interface module 24 on line 18 from interfering with the cable distribution system external to the user's home. For convenience, notch filter 12 can be installed at the point where the cable drop from the cable system enters the user's home. Alternatively, the notch filter can be installed on a telephone pole or at a junction box "at the curb" where the cable services are "dropped" to the subscriber location.

The operation of the notch filter is illustrated by the frequency spectrums shown in FIG. 2. The overall cable spectrum 50 extends from 0 to 860 MHz. The notch filter 12 will filter out a particular channel (channel "N") which is the channel to which the user's television 22 is tuned in order to receive the cable services. For example, channel "N" can be the 6 MHz channel slot assigned to channel 2 or channel 3. The effect of the notch filter is illustrated in spectrum 52, in which channel N has been filtered from the 0 to 860 MHz spectrum.

As illustrated in curve 54, the television signals and control data transmitted from the PC 20 to the user interface module 24 and vice versa are communicated within channel N. The resultant spectrum 56 communicated via cable 14 in the subscriber premises includes all of the channels in the original 860 MHz spectrum except for channel N, with channel N being filled in by the video and control data communicated between the PC 20 and the user interface module 24. Television 22 is also tuned to channel N in order to receive the selected television service output from the television interface card 40 which is installed in PC 20. The notch filter 12 will prevent the video and control signals communicated between the PC 20 and the user interface module 24 (and output to television 22) from interfering with the cable system outside of the subscriber premises.

Figure 3:
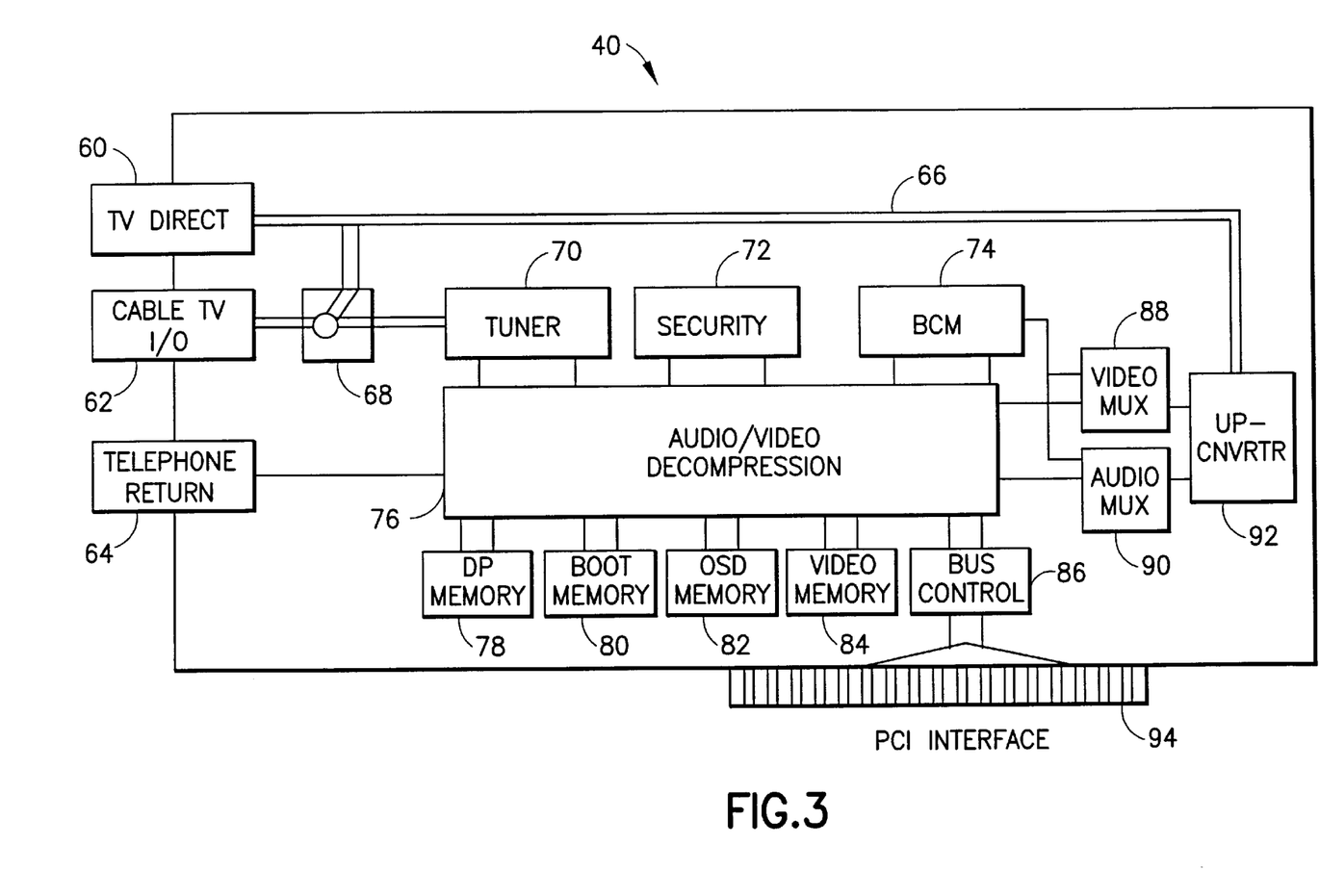
FIG. 3 is a block diagram illustrating an interface board for use in a personal computer in accordance with the present invention.

FIG. 3 illustrates the television interface card 40 that is installed in PC 20 in accordance with the present invention. The television interface 40 includes a standard circuit card connector 94, such as a PCI interface connector, for installation of the card into a standard expansion slot of the PC 20. Three ports are provided on the interface card. These are a TV direct port 60, cable TV I/O port 62 and telephone return port 64. The TV direct port 60 can be used as the input to a transceiver for a wireless implementation in which communications between the PC 20 and user interface module 24 are carried by radio frequency (RF) or infrared (IR) signals. Alternatively, the TV direct port can be used as a direct connection (e.g., coaxial connection) to the user's television.

The cable TV I/O port 62 allows connection of the interface card 40 to a single feed in the subscriber location, such as one tap of a coaxial house feed that has multiple outlets. Thus, no rewiring of the subscriber premises is necessary. When the cable TV I/O port is used in this manner, it is advantageous to include the notch filter 12 as indicated in FIGS. 1 and 2.

The telephone return port 64 enables a subscription television service provider (e.g., cable, satellite or MMDS) to poll the user's PC via a telephone connection in order to obtain billing information and/or to download new firmware to the television interface card and/or new application software to the user's PC. Polling can alternatively be implemented using an RF return path to the subscription television service provider.

Television signals from the service provider are input via cable TV I/O port 62 to a tuner 70 that selects a particular program or service based on selection commands received from the user interface module 24 (or directly from the user remote control 26). These commands are communicated to the television interface card 40 as data signals carried on the subscriber premises wiring ("in-home cable wiring") 14 (or in the case where the commands are received from the user remote, via a wireless RF link). The particular television channel tuned to will carry the desired television service, which is demodulated by the tuner 70 and passed on to a conventional audio/video decompression circuit 76. This circuit decodes the selected television service and outputs it to a video multiplexer 88 and audio multiplexer 90 in a conventional manner for subsequent upconversion by upconverter 92 to the particular channel frequency to which the user's television is tuned. For example, the user's television may be set to channel 2 or channel 3 in order to receive all television signals selected via the television interface card 40. Alternatively, baseband television signals can be provided as well known in the art.

Various additional features are provided by the television interface card 40. These include security circuitry 72 to prevent signal piracy. A backward compatible module (BCM) 74 provides compatibility with earlier set-top boxes used in various subscription television systems. Data processing memory 78, boot memory 80, on screen display memory 82 and video memory 84 are provided on the television interface card for use by the audio/video decompression processor 76 in a conventional manner. A bus controller 86 provides communication between the television interface card 40 and the standard PC bus accessed via card connector 94.

Figure 4:
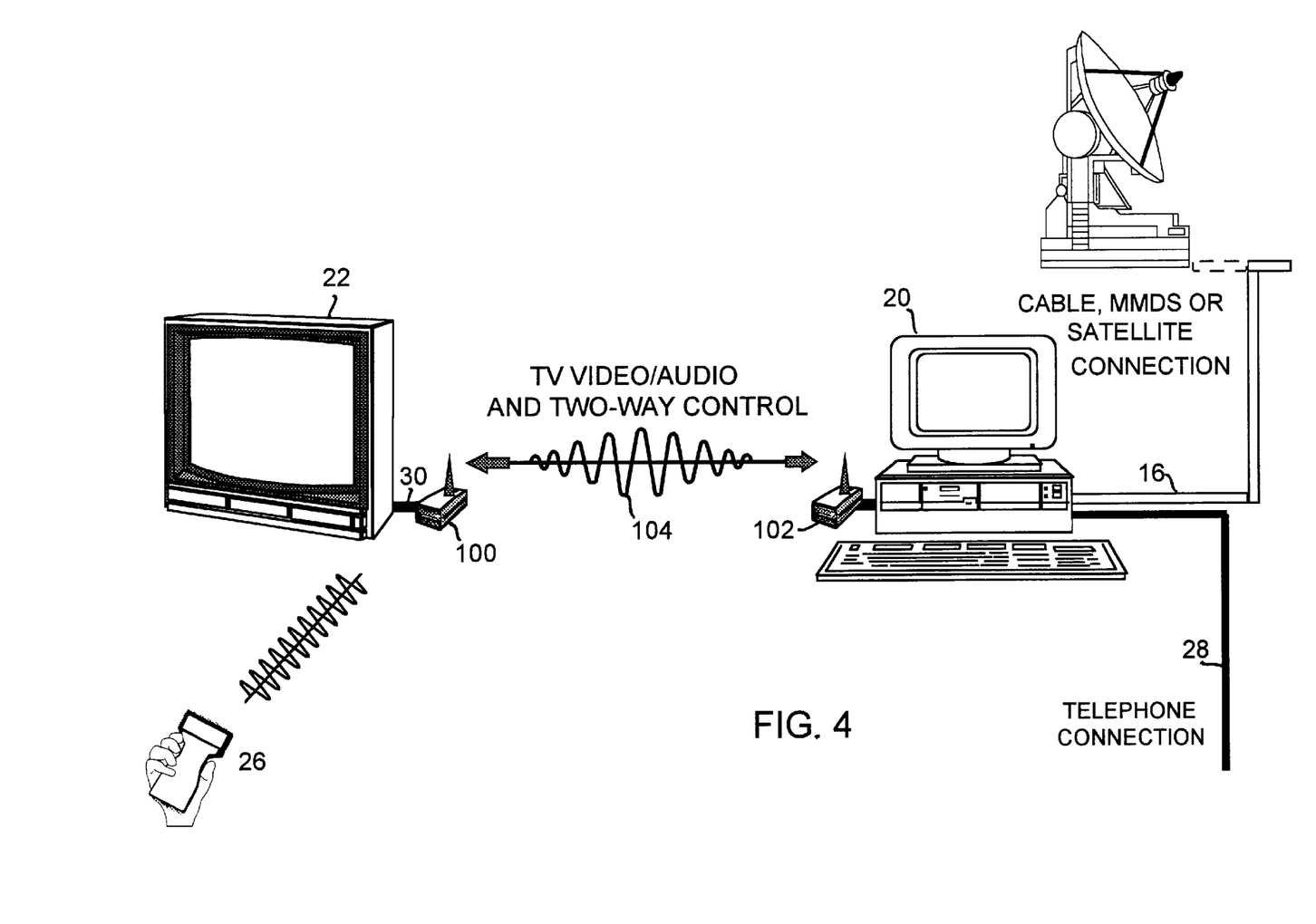
FIG. 4 is a block diagram of a wireless embodiment of a television system in accordance with the invention.

FIG. 4 illustrates an alternate embodiment in which communications between the PC 20 and user television 22 are provided by a wireless link 104. The wireless link can comprise, for example, an RF link or an IR link. The main difference between the embodiments of FIGS. 1 and 4 is that in FIG. 4, the wireless link 104 replaces the use of the in-home cable wiring 14 in order to communicate the in-home video signals and two-way control channel data between the PC 20 and the user's television 22. User interface module 24 of FIG. 1 is replaced with a wireless user interface module 100. The wireless user interface module 100 has the same functionality as the wired user interface module 24 illustrated in FIG. 1. A wireless PC interface 102 communicates with the user interface module 100 over the wireless link. The use of a wireless link, although slightly more expensive, obviates the need for the system to tap into the in-home cable wiring at the subscriber premises. Since the local signals between the PC and the user's television are not communicated over the in-home cable wiring, no notch filter is provided as in the embodiment of FIG. 1.

Figure 5:
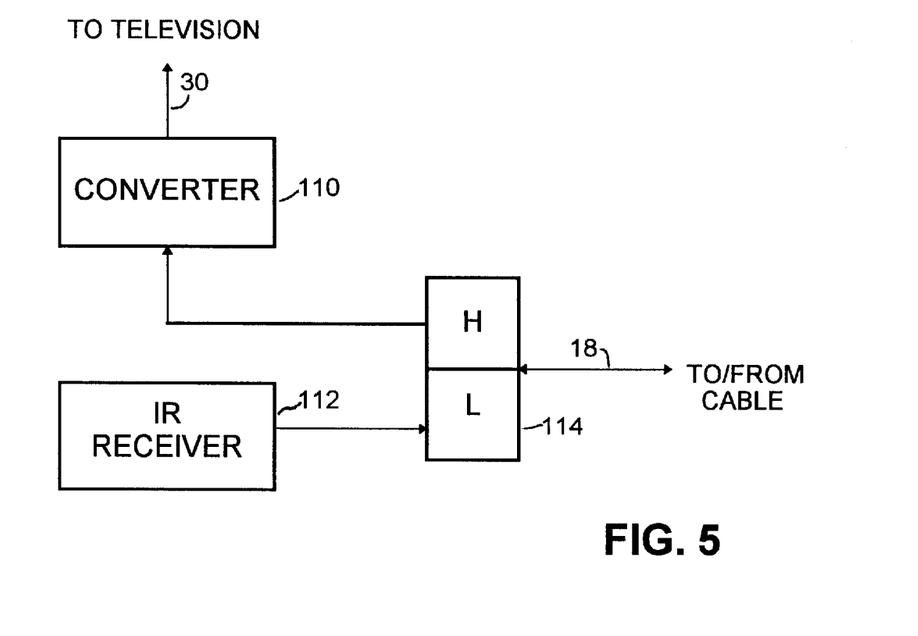
FIG. 5 is a block diagram of a cable connected user interface in accordance with the invention.

FIG. 5 is a block diagram illustrating the components of the user interface module 24 of FIGS. 1 and 2. As previously discussed, the user interface module is coupled to the in-home cable wiring via path 18. A diplexer 114 couples the cable signals to a converter 110 via a high pass filter (H) portion of the diplexer 114. Converter 110 is a conventional television converter, which converts the received television signal to a standard output channel frequency (e.g., channel 3) for output to the user's television via line 30. Signals received from the user's remote control 26 via an IR receiver 112 are output to the in-home cable wiring via a low pass filter (L) section of diplexer 114. The control signals from the IR receiver are coupled to the PC 20 via path 18, in-home cable wiring 14, and path 16 as previously described.

Figure 6:
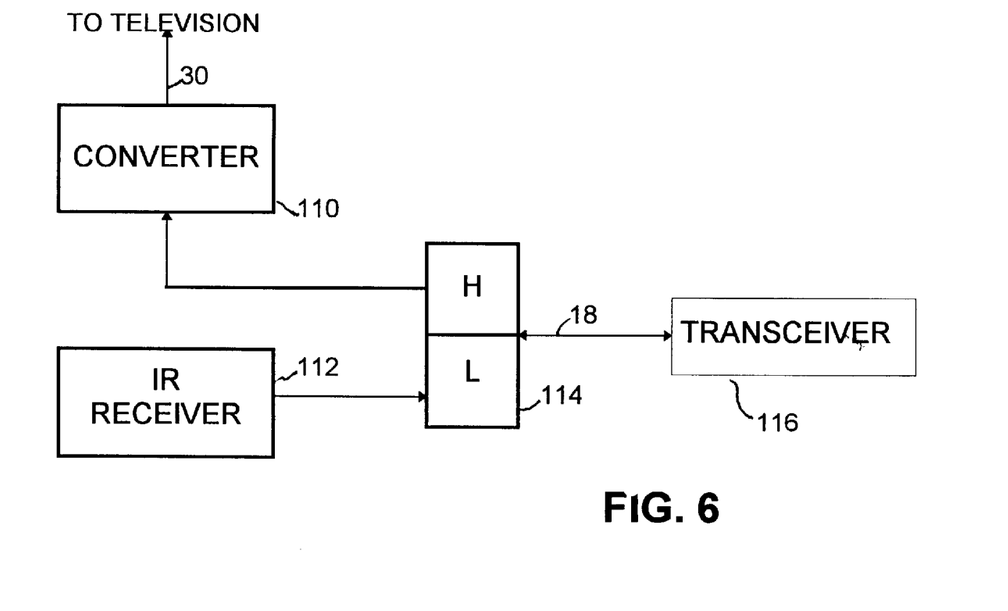
FIG. 6 is a block diagram of a wireless user interface in accordance with the invention.

FIG. 6 is a block diagram illustrating the wireless user interface module 100 of FIG. 4. The wireless interface module is substantially the same as the interface depicted in FIG. 5, except that a transceiver 116 is added. The transceiver 116 transmits signals to the PC using, for example, RF signal transmission. Transceiver 116 receives television and two-way control signals from the PC via a similar (e.g., RF) path.

The PC interface 102 of FIG. 4 can comprise a simple antenna, which is coupled to a transceiver (not shown) on the television interface card 40 installed in the PC 20. The transceiver provided on the television interface card will be the counterpart of transceiver 116 illustrated in FIG. 6.

Figure 7:
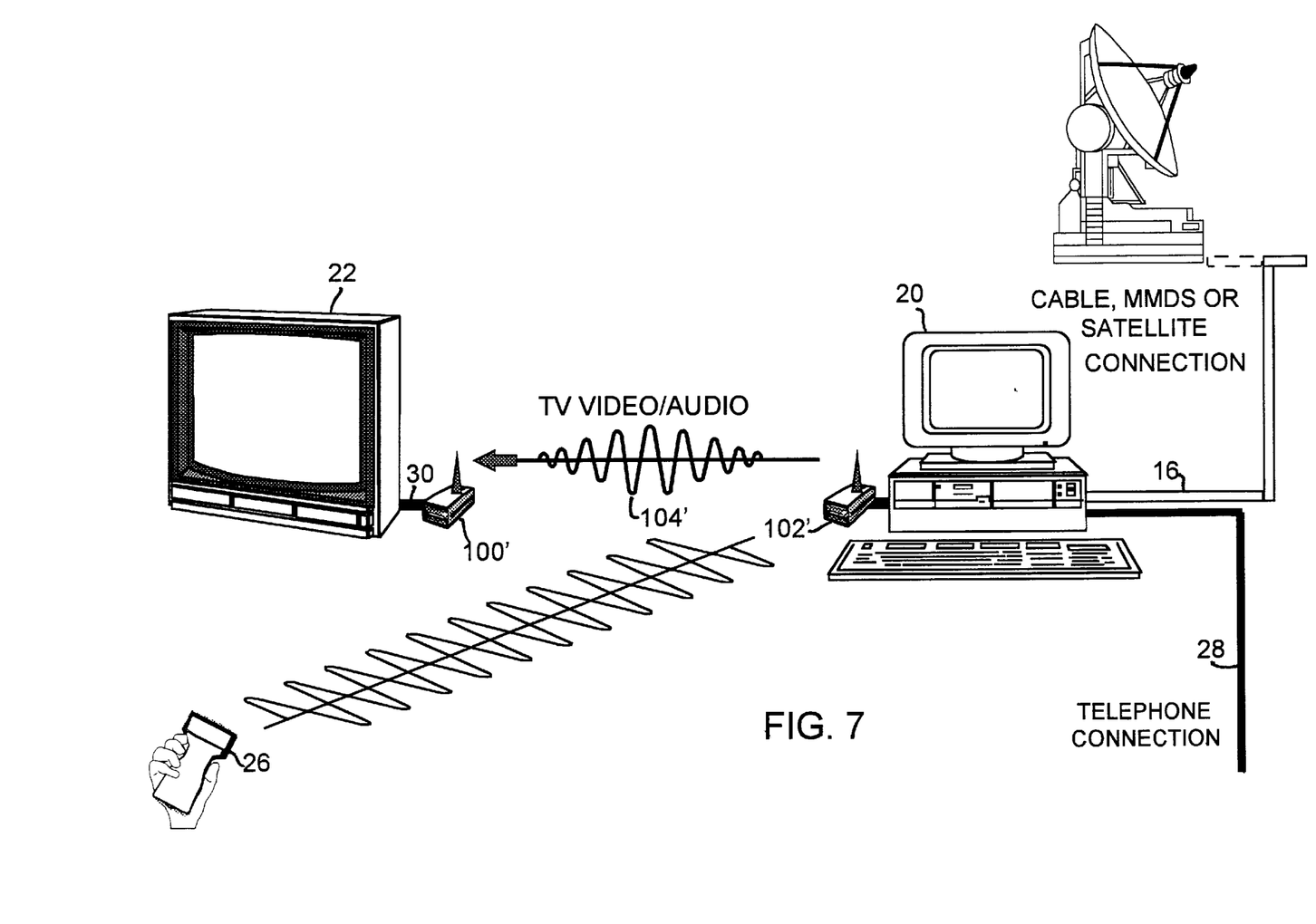
FIG. 7 is a block diagram of an alternate wireless embodiment wherein a remote control component of the user interface communicates directly with the personal computer interface.

FIG. 7 illustrates an alternate embodiment in which the subscriber remote control 26 communicates directly with the PC interface 102'. For example, the remote control 26 can comprise an RF transmitting device instead of an IR remote control. This arrangement simplifies the electronics and cost significantly by removing the necessity of a transmitter/receiver in the television interface module 100'.

In the embodiment of FIG. 7, PC interface 102' directly receives the commands entered by the user via the remote control 26. An RF transceiver in PC interface 102' converts the received RF control signals for input to the television interface card 40. Alternatively, the PC interface 102' can comprise a simple RF antenna, in which case the RF receiver is located directly on the television interface card. A separate RE channel is used to communicate the selected television signals via path 104' to the television interface module 100'. The television interface module 100' is similar to that illustrated in FIG. 6, except that transceiver 116 will be replaced with a simple receiver since only one-way reception of signals from. the PC is required. Again, the transmitter over which the television signals are communicated from the PC to the television interface module 100' can reside on the television interface card 40 or could be located in the PC interface 102'. The preferred and more cost effective approach is to place as much of the hardware on the television interface card 40. In this instance, PC interface 102' is simply an RF antenna which is coupled to the television interface card 40.

The embodiment of FIG. 7 is particularly attractive with digital television (DTV) and/or high definition television (HDTV) signals. With such signals, broadcast channels will be digital and encrypted, with decompression and decryption provided by the television 22. Thus, security s maintained over the RF link from the PC interface 102' to the television interface module 100'. This overcomes the potential disadvantage of nondigital television signals, in which the RF signal from the PC to the television is "in the clear" whereby subscription channels could potentially be received by adjacent systems in adjoining apartments, for example.

It should now be appreciated that the present invention enables a PC to perform all of the functionality of a full featured set-top for a remotely connected television. The invention provides a low cost alternative to cable, satellite and MMDS providers, and enhances the capability of the subscriber's personal computer as a multimedia, data, video and audio terminal. Moreover, the capability of the PC far exceeds that of a conventional fixed hardware, limited memory set-top box. All set-top applications such as Electronic Program Guide, Internet Browser, and the like are resident in the PC and may be updated or renewed by downloading new software via a cable, satellite, MMDS or telephone modem. Digital and/or analog television signals are received into the PC and (when necessary) decompressed. The resulting signals are combined with any graphic images being generated at the request of the subscriber. All of the television related functions take place in the multitasking environment of the PC, allowing free use of the PC for other applications concurrently.

Although the invention has been described in connection with various illustrated embodiments, it will be appreciated that numerous adaptations and modifications may be made thereto without departing from the scope of the invention as set forth in the claims.

What is claimed is:

1. A user interface for a cable television system, comprising:

means for inputting user requests for the selection of television program signals, wherein said television program signals are initially received at a personal computer (PC);

means responsive to said inputting means for converting said user requests into electrical signals;

first means for communicating said electrical signals to the PC, said PC having a first display associated therewith for displaying information received from the PC;

second means for receiving selected television program signals from said PC in response to said electrical signals; and third means for communicating the received television signals to a television appliance having a second display associated therewith for displaying television images in accordance with said television signals.

2. An interface in accordance with claim 1 wherein:

said PC receives said television signals from a cable distribution system;

said first means are coupled to said cable distribution system for communicating said electrical signals to said PC; and said television signals are communicated from said PC to said user interface via said cable distribution system.

3. An interface in accordance with claim 2 wherein:

said television signals are transmitted from said PC on a fixed television channel frequency; and a notch filter is provided for blocking said television signals on said fixed television channel frequency from interfering with other signals on said cable distribution system.

4. An interface in accordance with claim 1 wherein said first and second means comprise a wireless communication path.

5. A television system for use with (i) a personal computer (PC) having a first display associated therewith for displaying information received from the PC, and (ii) a television appliance which is independent of said PC, said system comprising:

a television interface operatively associated with said PC, said television interface including a television tuner enabling the selection of television program services by said PC for output to said television appliance, wherein television program signals are initially received at said PC; and a user interface adapted to be collocated with said television appliance and in communication with said PC, for enabling a user to remotely control said PC to select television program services to be displayed on a second display associated with said television appliance.

6. A television system in accordance with claim 5 wherein said user interface and PC communicate over a wireless link comprising:

a first transceiver operatively associated with said television interface for transmitting said television services to said television appliance and receiving control signals from said user interface; and a second transceiver operatively associated with said television appliance and said user interface for receiving said television services from said television interface and transmitting said control signals to said television interface.

7. A television system in accordance with claim 5 wherein said television interface includes means for controlling a video recorder in response to instructions received from said user interface.

8. A television system in accordance with claim 5 wherein said PC provides computer resources for use by said television interface.

9. A television system in accordance with claim 8 wherein said computer resources are shared by said PC and said television interface, and include at least one of a hard drive, random access memory and a central processing unit.

10. A television system in accordance with claim 8 wherein said computer resources are used by said television interface to provide digital television services to said user.

11. A television system in accordance with claim 5 wherein said television interface provides compatibility among a plurality of consumer television appliances.

12. A user interface for a cable television system, comprising:

means for inputting user requests for the selection of television program signals, wherein said television program signals are initially received at a personal computer (PC);

means responsive to said inputting means for converting said user requests into electrical signals;

first means for communicating said electrical signals to the PC, said PC having a first display associated therewith for displaying information received from the PC;

second means for receiving selected television program signals from said PC in response to said electrical signals; and third means for communicating the received television signals to a television appliance having a second display associated therewith for displaying television images in accordance with said television signals, wherein television services provided on said television appliance and unrelated applications provided on said PC can be concurrently accessed.

13. A television system for use with (i) a personal computer (PC) having a first display associated therewith for displaying information received from the PC, and (ii) a television appliance which is independent of said PC, said system comprising:

a television interface operatively associated with said PC, said television interface including a television tuner enabling the selection of television program services by said PC for output to said television appliance, wherein said television program signals are initially received at said PC; and a user interface adapted to be collocated with said television appliance and in communication with said PC, for enabling a user to remotely control said PC to select television program services to be displayed on a second display associated with said television appliance, wherein television services provided on said television appliance and unrelated applications provided on said PC can be concurrently accessed.

* * * * *

UNITED STATES PATENT AND TRADEMARK OFFICE
CERTIFICATE OF CORRECTION

PATENT NO.     : 6,271,837 B1
DATED          : August 7, 2001
INVENTOR(S)    : Naiff It is certified that error appears in the above-identified patent and that said Letters Patent is hereby corrected as shown below:

<u>Title page,</u>
Item [56], References Cited, add the following two references:

Under U.S. PATENT DOCUMENTS add:

-- 4,777,657     10/1998        Gillaspie --

Under FOREIGN PATENT DOCUMENTS add:

-- GB 2 283 399       5/1995        (GB) --

Signed and Sealed this

Twenty-seventh Day of August, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,271,837 B1
DATED : August 7, 2001
INVENTOR(S) : Naiff

It is certified that error appears in the above-identified patent and that said Letters Patent is hereby corrected as shown below:

Column 10,
Lines 35-37, "said television program signals are initially received at a personal computer (PC)" is changed to -- a personal computer (PC) functioning as a set-top box is used to initially receive, select and process video and/or audio television signals --.

Column 11,
Lines 13-14, "television program signals are initially received at said PC" is changed to -- said PC functioning as a set-top box is used to initially receive, select and process video and/or audio television signals --.

Column 12,
Lines 7-9, "said television program signals are initially received at a personal computer (PC)" is changed to -- a personal computer (PC) functioning as a set-top box is used to initially receive, select and process video and/or audio television signals --.
Lines 35-36, "said television program signals are initially received at said PC" is changed to -- said PC functioning as a set-top box is used to initially receive, select and process video and/or audio television signals --.

Signed and Sealed this

Twenty-sixth Day of November, 2002

Attest:

Attesting Officer

JAMES E. ROGAN
Director of the United States Patent and Trademark Office